Figure 1:
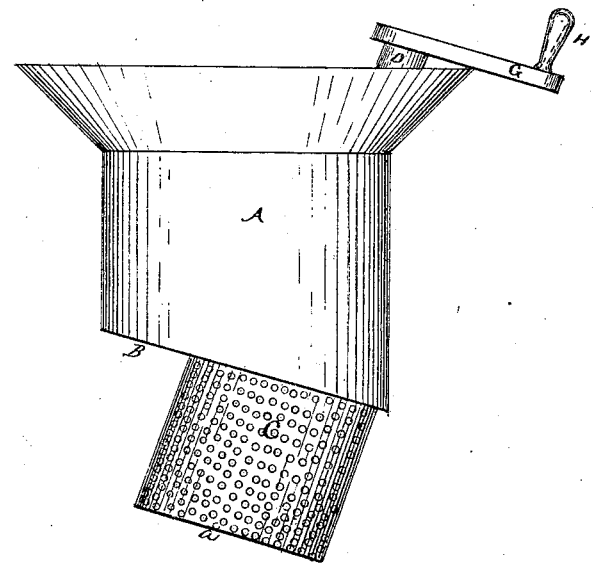
Figure 2:
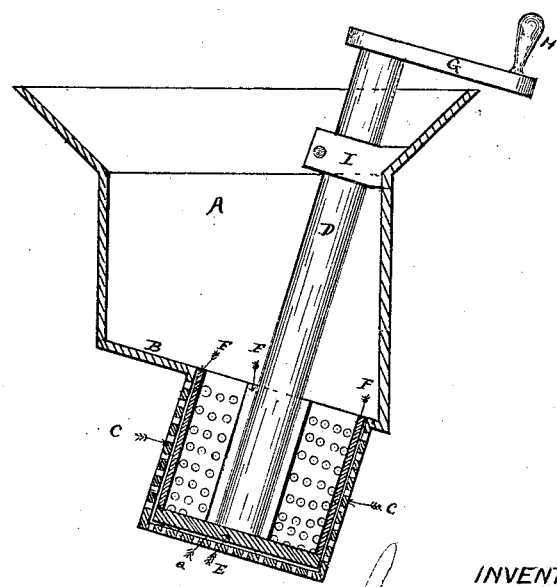

J. PEASE.
Improvement in Cream-Strainers.

No. 130,862.  Patented Aug. 27, 1872.

WITNESSES:
Franklin Darritt
Richard Gerner

INVENTOR:
James Pease
By Henry Gerner
Attorney.

UNITED STATES PATENT OFFICE.

JAMES PEASE, OF PANAMA, NEW YORK.

IMPROVEMENT IN CREAM-STRAINERS.

Specification forming part of Letters Patent No. 130,862, dated August 27, 1872.

Specification describing certain Improvements in "Cream-Strainers," invented by JAMES PEASE, of Panama, county of Chautauqua, State of New York.

My invention consists in attaching to a vessel, the bottom of which is slightly inclined, a strainer or colander, also inclined, into which is placed a shaft having attached to its lower end four or more beaters, and extending upward above the top of the vessel, where it is made to rotate by means of a crank and handle attached thereto.

In order to describe the invention more fully I will refer to the accompanying drawing.

Figure I is a side view of a cream-strainer embodying my invention. Fig. II is a sectional view of the same.

A represents a vessel constructed either of metal or wood, and whose upper edge is bell-shaped. The bottom B is made slightly inclined and having a colander or strainer, C, inserted therein. Into this strainer is inserted the shaft D, which rests with the cross-pieces E upon the bottom a of the strainer C. To these cross-pieces E are fastened the beaters F, which extend upward to the top of the strainer and are made of flexible metal or wood, sprung outward at the top. On the top of the shaft D is fastened the crank G having attached thereto the handle H. The shaft D is held in its place when rotated by means of a fastener, I, attached to the vessel A. It will readily be understood that when the cream is introduced into the vessel A, it will, owing to the inclined bottom of the same, run down into the perforated strainer. The beaters are then placed into the strainer and made to rotate, through the action of the crank, which forces the cream through the perforations. The beaters, when placed into the strainer, press on the sides of the same as well as on the bottom, and thus force the cream constantly out through the perforations. The device of setting the shaft in a slanting position, parallel with the perforated strainer and held in its position by the fastener I, does away with the necessity of using cross-bars and thus places the shaft and crank out of the way without being an impediment in pouring the cream into the vessel A, or in cleaning the same. The beaters will work equally well in any direction the shaft and crank are turned.

Having thus fully described my invention, I desire to claim—

The strainer C, shaft D, cross-pieces E, beaters F, crank G, and fastener I, in combination with the vessel A with the inclined bottom B, substantially as and for the purpose hereinbefore set forth.

JAMES PEASE.

Witnesses:
O. S. HAIGHT,
LESTER CRANE.